(12) United States Patent
Mittelstädt (10) Patent No.: US 11,120,588 B2
(45) Date of Patent: Sep. 14, 2021

(54) METHOD AND SYSTEM FOR COMPUTER-ASSISTED MONITORING OF A TECHNICAL SYSTEM

(71) Applicant: Siemens Aktiengesellschaft, Munich (DE)

(72) Inventor: Sebastian Mittelstädt, Munich-Haidhausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/650,169

(22) PCT Filed: Sep. 12, 2018

(86) PCT No.: PCT/EP2018/074544
§ 371 (c)(1),
(2) Date: Mar. 24, 2020

(87) PCT Pub. No.: WO2019/063283
PCT Pub. Date: Apr. 4, 2019

(65) Prior Publication Data
US 2020/0234474 A1     Jul. 23, 2020

(30) Foreign Application Priority Data
Sep. 27, 2017  (EP) ..................... 17193495

(51) Int. Cl.
*G06T 11/20* (2006.01)
*G06T 11/00* (2006.01)
*G06T 11/60* (2006.01)

(52) U.S. Cl.
CPC .......... *G06T 11/206* (2013.01); *G06T 11/001* (2013.01); *G06T 11/60* (2013.01)

(58) Field of Classification Search
CPC ....... G06T 11/206; G06T 11/001; G06T 11/60
See application file for complete search history.

(56) References Cited

U.S. PATENT DOCUMENTS

| | | | |
|---|---|---|---|
| 6,195,103 B1 | 2/2001 | Stewart | |
| 6,429,868 B1 | 8/2002 | Dehner, Jr. | |

(Continued)

FOREIGN PATENT DOCUMENTS

| | | |
|---|---|---|
| CN | 102629271 B | 12/2013 |
| GB | 2479055 A | 9/2011 |

OTHER PUBLICATIONS

PCT International Search Report and Written Opinion of International Searching Authority dated May 2, 2019 corresponding to PCT International Application No. PCT/EP2018/074544 filed Dec. 9, 2018.

(Continued)

*Primary Examiner* — Chong Wu
(74) *Attorney, Agent, or Firm* — Schmeiser, Olsen & Watts LLP (57) ABSTRACT

A method for computer-assisted monitoring of a technical system is provided. A set of data from at least one data source is received, the set of data consisting of a plurality of data values acquired within a given time period. The given time period in a plurality of time slots is divided, each of the time slots comprising a subset of data values. For each time slot, statistical values from the subset of data values are calculated, at least one first statistical value comprising an extreme value at least one second statistical value describing a distribution of the subset of data values. For each time slot, each of the at least one first statistical value and the at least one second statistical value is mapped to a respective first and a respective second color value of a color scale.

9 Claims, 6 Drawing Sheets (56) References Cited

U.S. PATENT DOCUMENTS

2007/0109301 A1\* 5/2007 Smith .................. G06T 11/206
  345/440
2015/0213631 A1 7/2015 Vander Broek
2015/0348060 A1 12/2015 Ogawa et al.

OTHER PUBLICATIONS

European Search Report dated Mar. 20, 2018 for Application No. 17193495.3.

\* cited by examiner

METHOD AND SYSTEM FOR COMPUTER-ASSISTED MONITORING OF A TECHNICAL SYSTEM

CROSS-REFERENCE TO RELATED APPLICATIONS

This application claims priority to PCT Application No. PCT/EP2018/074544, having a filing date of Sep. 12, 2018, which is based on European Application No. 17193495.3, having a filing date of Sep. 27, 2017, the entire contents both of which are hereby incorporated by reference.

FIELD OF TECHNOLOGY

The following relates to a method for computer-assisted monitoring of a technical system. The following further relates to a system for computer-assisted monitoring of a technical system.

BACKGROUND

Monitoring a technical system produces a huge amount of sensor data which is transferred to an analysis system. Monitoring and analyzing of this data is challenging, because it is required to overview the full amount of data of a single or multiple machines of the technical systems. Monitoring and analysis of sensor data aim to detect anomalies and patterns. However, detection of anomalies and patterns is not possible with current visualization technologies due to different problems:

Overplotting: Data points originating from different data sources can be plotted over each other on a screen. Hence, it can be difficult for a user to evaluate the data on the screen and to differentiate between different data.

Scrolling: Visualizations may not fit on one screen if the amount of data to be analyzed is huge. Hence, a user monitoring the data on a screen has to scroll which hinders the user to overview the full data at one sight.

Scalability: In particular, when a huge amount of data has to be analyzed, the visualization often cannot visualize the full data, e.g. because of the size of the screen or because of the limited number of pixels of the screen.

Characterizing patterns of the data cannot be detected, such as seasonal patterns, extreme values or aggregated values which are biased by extreme values.

There is a demand to have a visualization technique which solves all the above mentioned problems at once. However, visualization techniques as used till now are only able to provide a solution to some of the above mentioned problems.

Figure 1:
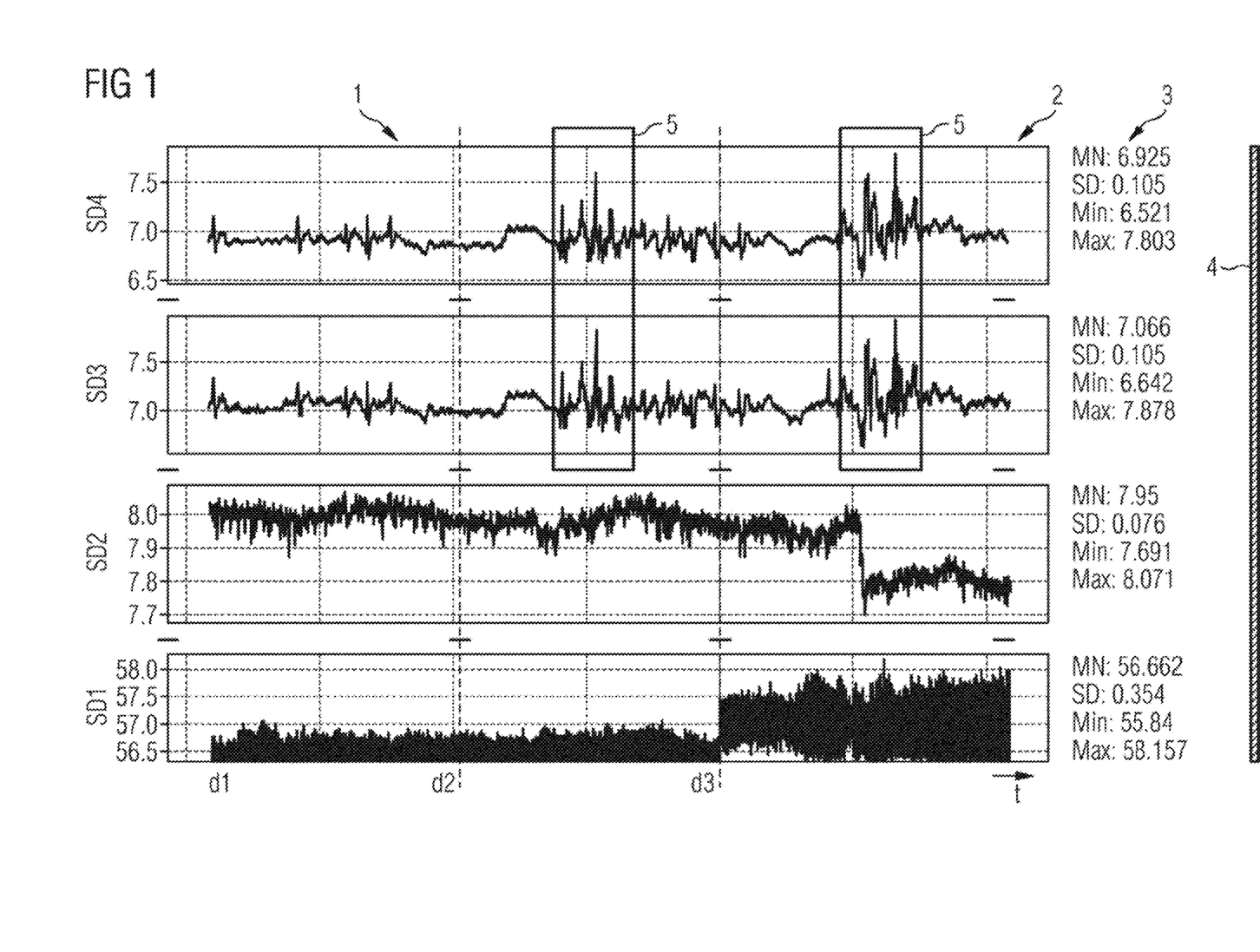
FIG. 1 shows a visualization with a number of line charts of a couple of data sources according to the conventional art.

A common technique is the known line chart visualization, as shown in FIG. 1. FIG. 1 shows a visualization, where sensor data of one sensor SD1, . . . , SD4 per chart are shown. In FIG. 1, by way of example, data values of four different sensors SD1, . . . , SD4 are shown. However, it is to be understood that the number of sensors to be visualized in one chart may be less or more than four. The sensor data SD1, . . . , SD4 shown in FIG. 1 may be data from different sensors of a technical system to be monitored. By way of example only, data of three days d1, d2, d3 are shown over the time t.

Besides a graphical section 2 which shows the line charts of sensor data SD1, . . . , SD4, a data section 3 is given. The data section 3 illustrates statistical data for the sensor data SD1, . . . , SD4 in the graphical section 2. By way of example only, a mean value MN, a standard deviation SD, a minimum value Min and a maximum value Max together with their respective values are assigned to the sensor data SD1, . . . , SD4 in the data section 3.

However, line chart visualization, as shown in FIG. 1, has the problem that scrolling by means of a scrollbar 4 is necessary if monitoring of the technical system comprises the visualization of a huge amount of sensor data of different sensors. As shown in the example of FIG. 1, sensor data SD1 at the bottom of the visualization is cut off in its low area. To be able to visualize sensor data SD1 in its entirety, the scrollbar 4 has to be moved by a user.

As an advantage, line chart visualization can be used to detect regular patterns. With regard to sensor data SD3 and SD4 recurring events 5 during day d2 and d3 occur and can be realized by monitoring the data. However, interacting with the chart, e.g. to reveal that the pattern 5 is always happening at the same time at each day is not possible.

Alternatively, and not shown, in FIG. 1 multiple sensor data may be shown in one chart. This suffers, as explained above, from the problems of overplotting, scrolling, sometimes scalability and the fact that regular patterns cannot be detected.

Figure 2:
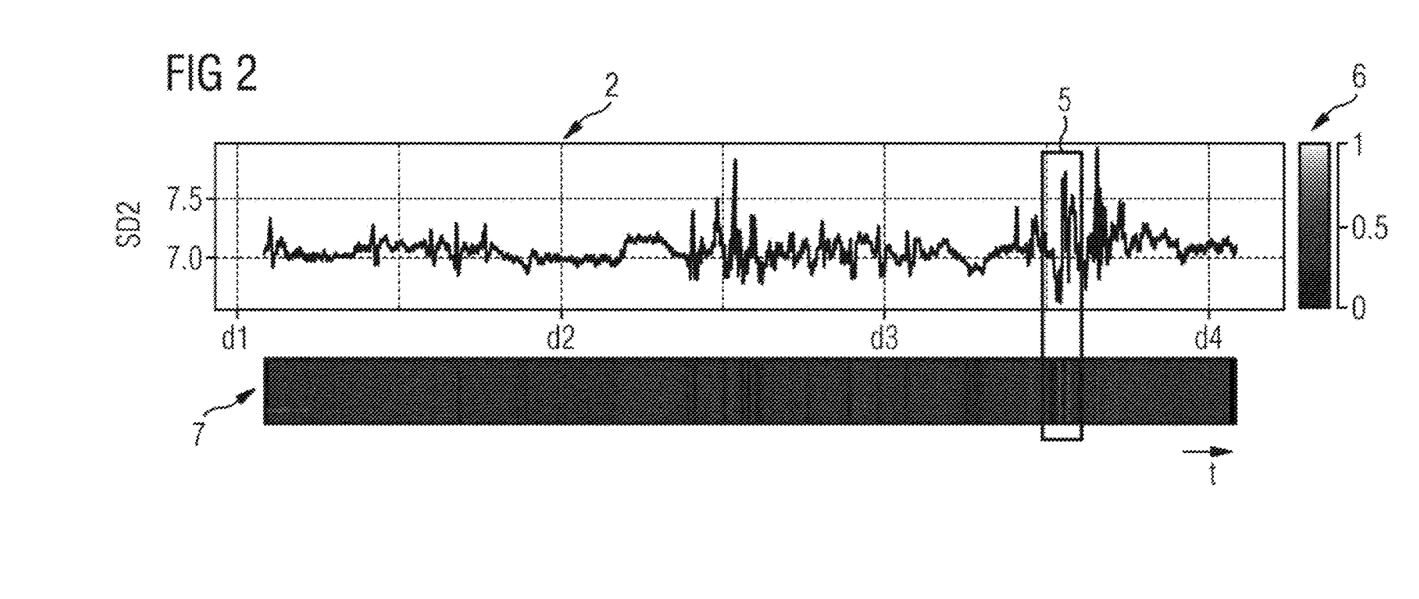
FIG. 2 shows a visualization in which data values of a line chart are assigned to a color scale wherein the data values are illustrated as a color varying bar.

Another known visualization technique is a pixel-based visualization which can map time series data to a colored pixel or pixel cell. FIG. 2 shows a pixel-based visualization of sensor data SD2 of FIG. 1. In the pixel-based visualization each data value of sensor data SD2 over time t is mapped to a color of a color scale 6. The color scale 6 is illustrated on the right hand side of the data progress. The color scale 6 comprises a normalized range of values between 0 and 1. However, it is to be understood that a range of values could be chosen in a different way.

The data values of the sensor data SD2 are initially mapped to the normalized range of values of the color scale. Each normalized value is assigned to a color of the color scale. In the color scale 6, a darkest color, e.g. black, is assigned to the value "0" of the normalized range of values. A lightest color, e.g. white, is assigned to the value "1" of the normalized range of values of the color scale 6. Between the darkest color and the lightest color of the color scale the color changes with a color gradient. As a result, the darkest color of the color scale 6, assigned to the value "0", represents a lowest possible value of the data value of sensor data SD2. Accordingly, the lightest color assigned to value "1" of the color scale 6 represents a highest possible value of sensor data SD2.

As a result of the mapping of the data values of the sensor data SD2 to a color of the color scale 6 a color based visualization 7 is generated where the color changes according to its normalized value over time t. In a so-called pixel-based visualization it is sufficient to visualize only the color based visualization 7 and to omit the data progress of the sensor data SD2. To enable a better interpretation of the colors of the pixel cell based visualization 7 the color scale 6 can be displayed in addition. Using a pixel-cell based visualization enables scaling to the number of pixels of a display. As a result, a huge amount of data values can be visualized. However, according to the number of data values, it can exceed the number of pixels of the monitor resulting in the situation that this method is not able to show full information of the data values. Hence, scrolling is necessary.

Common techniques using this kind of visualization are recursive patterns. This technique scales to a number of pixels of a display and can show masses of data. However, if the number of data points exceeds the number of pixels of a screen, the method can only show part of information of sensor data.

Other visualization techniques, such as two-tone coloring, horizongraphs, themeriver and cloudlines suffer under the same scalability problems as pixel-based visualization.

US 2015/0348060 A1 discloses a method and a system for assessing a store layout. Within the method, a store screen including at least one shelving unit object representing at least one shelving unit located in a store is displayed on a display. A plurality of types of merchandizing information from a management device is acquired. A first graphic item and a second graphic item on or near the shelving unit object each in a predetermined display state are overlaid, wherein the first graphic item and the second graphic item each correspond to one of the plurality of types of merchandizing information.

US 2015/0213631 A1 discloses a method for visualizing a number of events having different values for a field of interest over a selected time range. Counts of the number of events having various values during different time slots are mapped to a colored square within a heat map bucket. Statistical data is displayed beside the heat map.

U.S. Pat. No. 6,195,103 B1 discloses a system for displaying time series data as a color image. The color image is used to visualize fluctuations of volatile numeric values. A volatility plot representing the fluctuations in a time series of quantitative data as a rectangular color image on a computer display is used to visualize time series data, i.e. a sequence of numerical values ordered consecutively by time. The color in each square in the volatility plot is determined by values at two different times in the time series. The first time is indicated by position on a horizontal axis. The second time is equal to the first time minus a number of time steps equal to a row index of the small square, counted from the top edge of the volatility plot image.

GB 2 479 055 A discloses a method for a graphical display of medical information. A color-coded image of medical information is provided by obtaining data values, grouping the data values into one or more data ranges, the data ranges representing a range of data values, mapping colors to the data ranges in a manner that allows the color to visually indicate the magnitude of the data ranges and marking an indicator for each data value on a graph, the indicator marked with a mapped color of the data range that comprises the data value of the physiological variable.

SUMMARY

An aspect relates to a method which enables a better visualization of huge amount of data of a technical system to enable a computer-assisted monitoring of the technical system. It is a further aspect to provide a system which incorporates the method.

According to a first aspect of embodiments of the invention, a method for computer-assisted monitoring of a technical system is provided. The method comprises receiving a set of data from at least one data source, the set of data consisting of a plurality of data values acquired within a given time period. The data values acquired within a given time period can be data values of a data stream. For each data source, the data values can be acquired with a given frequency, for example, by means of a sensor. The method comprises dividing the given time period in a plurality of time slots, each of the time slots comprising a subset of data values. Preferably, the length of the plurality of time slots is equal. For each time slot, statistical values from the subset of data values are calculated, at least one first statistical value comprising an extreme value and at least one second statistical value describing a distribution of the subset of data values. For each time slot, each of the at least one first statistical value and the at least one second statistical value are mapped to a respective first and a respective second color value of a color scale. For each time slot, the at least one first and the at least one second color value are mapped in an information block consisting of a number of information cells corresponding to the number of color values and being arranged adjacent in a predetermined manner, wherein each information cell is colored within the respective color value of the at least one first statistical value and the at least one second statistical value. Further, the information blocks of at least a part of the time slots are displayed in their sequence of appearance in the set of data on a screen for indicating a color gradient of the information cells over time.

According to this method, an aggregation of statistical values is made which are mapped to a color of a colored information cell. These colors representing a statistical value of the time slot are visualized on the screen. As a result, the full information of a time slot can be restored. In particular, expected values and data distribution is visible where it is possible to let them not be affected by outliers. The visualization can visualize an unlimited number of values of one or more data sources, in particular sensors, over time depending on the level of aggregation. Therefore, scalability, scrolling and overplotting can be overcome. In addition, regular patterns, such as seasonal patterns, can be revealed.

According to a preferred embodiment, the time slots are of equal length. Hence, a development of the data values over time can be monitored.

According to a further preferred embodiment, the data values within the given time period are acquired with a given frequency and are therefore equidistant over time. Hence, a good comparability of the data values according to their assigned colors over time is possible.

According to a further preferred embodiment, the at least one first statistical value comprises a maximum value and/or a minimum value as extreme values. In other words, calculating statistical values from each subset of data values for each time slot comprises a maximum and/or minimum value which enables to realize whether an exceptional state of a technical system had occurred.

According to a further preferred embodiment, the at least one second statistical value comprises one or more of the following values: a mean of the subset of data values; a standard deviation of the subset of data values; a quantile of the subset of data values, in particular, a median of the subset of data values, a 25%-quantile of the subset of data values and/or a 75%-quantile of the subset of data values. Expected value and data distribution can be visualized by a median value and quartiles, allowing to detect still extreme values. All of the latter statistical values are not affected by outliers of extreme values, such as a maximum value or a minimum value. Since the extreme values are visualized in another information cell, this information still is available for monitoring the technical system.

According to a further preferred embodiment, the information cells of an information block may be arranged top-down and a plurality of information blocks is arranged from left to right. Alternatively, the information cells of an information block are arranged from left to right and a plurality of information blocks is arranged top-down. By both of these visualization techniques, a huge amount of time dependent data can be visualized on a screen without the necessity to scroll.

According to a further preferred embodiment, the information blocks of a predetermined number of subsets of data sets corresponding to a first time interval are displayed in a first line, being a row or a column, and the information blocks of the same number of subsets of data sets corresponding to a second time interval not intersecting with the first time interval are displayed in a second line, being a row or a column, wherein the first and the second lines are displayed aligned and below or beside each other. This visualization enables to compare data values aggregated and assigned to information cells within information blocks of same time intervals, such as hours or days or weeks and so on. As a result, detection and comparability of a regular events is possible.

According to a second aspect, a computer program product (non-transitory computer readable storage medium having instructions, which when executed by a processor, perform actions) directly loadable into the internal memory of a digital computer is suggested, the computer program product comprising software code portions for performing the steps of the method as set out in this description when the product is run on a computer. The computer program product may be in the form of a CD-ROM, a DVD, a USB-memory stick and the like. The computer program product may be in the form of a signal which may be transmitted over a wireless or wired network as well.

According to a third aspect of embodiments of the invention, a system for computer-assisted monitoring of a technical system is provided. The system comprise a first means for receiving a set of data from at least one data source, the set of data consisting of a plurality of data values acquired within a given time period and a second means for dividing the given time period in a plurality of time slots, each of the time slots comprising a subset of data values. The second means is adapted to calculate, for each time slot, statistical values from a subset of data values, at least one first statistical value comprising an extreme value and at least one second statistical value describing a distribution of the subset of data values. The second means is adapted to map, for each time slot, each of the at least one first statistical value and the at least one second statistical value to a respective first and a respective second color value of a color scale. The second means is further adapted to map, for each time slot, the at least one first and the at least one second color value in an information block consisting of a number of information cells corresponding to the number of color values and being arranged adjacent in a predetermined manner, and to color each information cell with the respective color value of the at least one first statistical value and the at least one second statistical value. The system further comprises a third means for displaying the information blocks of at least a part of the time slots in their sequence of appearance in the set of data on a screen for indicating a color gradient of the information cells over time.

The system as set out above has the same advantages as described in conjunction with the method according to embodiments of the invention.

According to a preferred embodiment, a fourth means is provided to evaluate the color gradient of the information cells over time.

BRIEF DESCRIPTION

Some of the embodiments will be described in detail, with reference to the following figures, wherein like designations denote like members, wherein.

DETAILED DESCRIPTION

Figure 3:
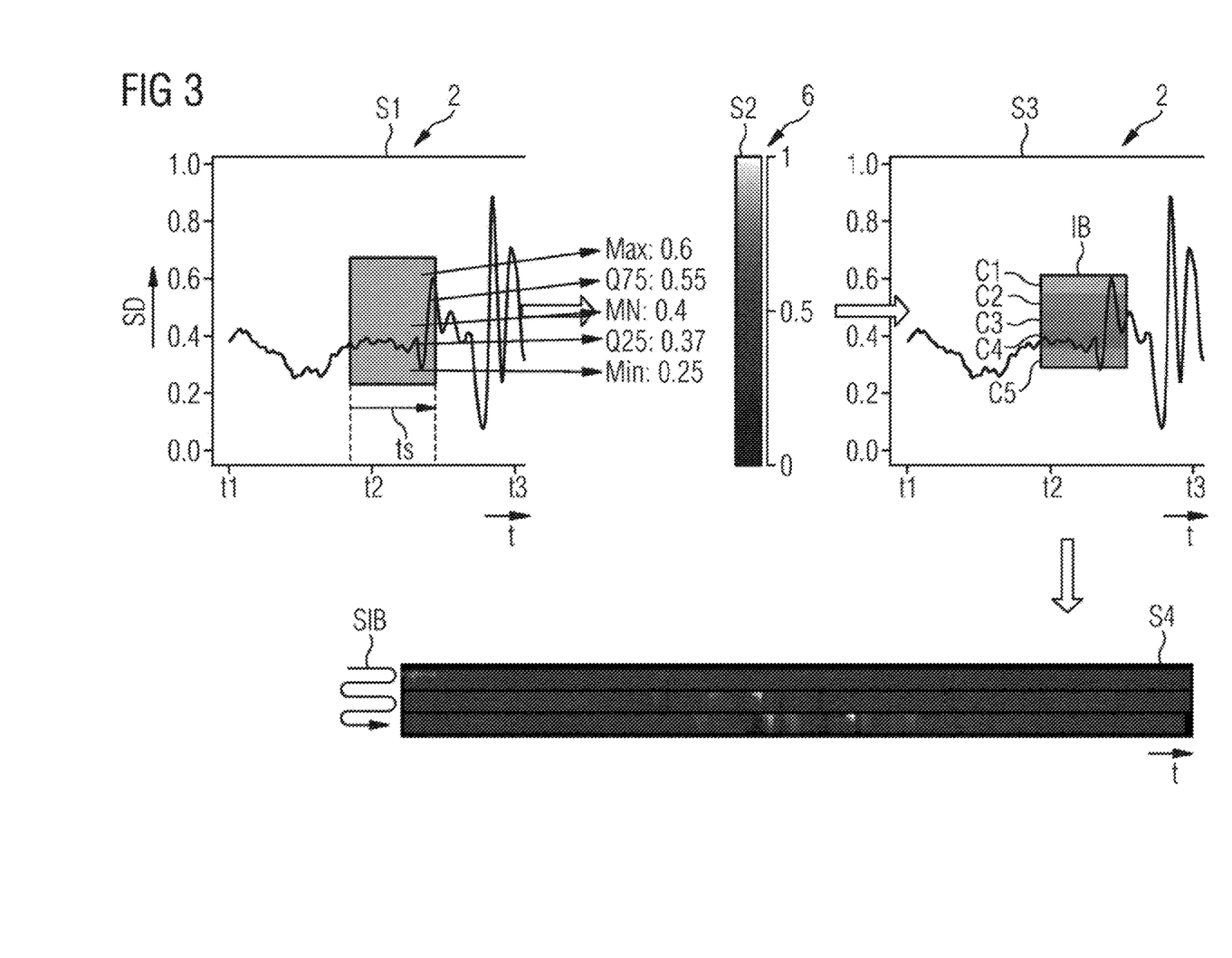
FIG. 3 shows different steps according to the method of embodiments of the invention for computer-assisted monitoring of a technical system by aggregating and visualizing a number of statistical values by means of a pixel-based visualization technique.

FIG. 3 shows the proceeding according to the method of embodiments of the invention to enable a computer-assisted monitoring of a technical system, such as an electrical pump adapted to mine oil downhole. In such a technical system, a plurality of sensors is provided each of them acquiring data with a given frequency all day long. Sensor data are used to monitor the health of the technical system as well as to find an indication that a problem might occur in the future. The method described below is able to ease monitoring a huge amount of data which have been acquired, for example, over weeks or months.

Sensors are installed, e.g., to electrical submersible pumps, which are mining oil downhole. Sensors are installed to measure e.g., ground-, head- and stub-pressure as well as oil temperature and motor current. In total, e.g., 8 sensors are typically installed at downhole pumps. If pumps trip due to different damages, the sensors of the last couple months are typically analyzed to detect suspicious patterns and anomalies in the data in order to estimate the root cause and the potential damage of the pump. The pump is not lifted if the damage is too severe, other parts of the system could be at risk, or the lift is too expensive in comparison to the benefit. Also, some damages can be fixed by simply flushing the pump if the root cause is a blockage, e.g, due to paraffin. Therefore, the wish is for a visualization that overviews multiple sensors over months, to highlight seasonal patterns and extremes in order estimate the possible root cause of a trip and to decide which maintenance is appropriate.

In a first step S1 the data progress of a set of data of a (each) data source, e.g. sensor value, is divided in a plurality of time slots ts, wherein each of the time slots ts comprises a subset of data values. In FIG. 3, only one timeslot ts of sensor data SD plotted over time t is marked by a shaded rectangle.

Next, statistical values are calculated from the subset of data values of the marked timeslot ts. By way of example only, five statistical values are calculated, two of them representing extreme values (Max, Min) and three of them representing the distribution of the subset of data values of the chosen time slot ts. By way of example, those statistical values are a 75%-quartile (Q75), a median MN and a 25%-quartile (Q25). Although each of the statistical values has its data value calculated from the subset of data values of the time slot ts, the calculated values are not output on a screen.

In a second step S2, each of the statistical values Max, Q75, MN, Q25, Min is mapped to a respective color of a color scale. The color scale 6 has a color progress assigned to normalized values between 0 and 1. By way of example, the darkest color is assigned to the value "0" and the lightest color is assigned to the value "1". The mapping is made as explained above in conjunction with FIG. 2.

The result of mapping is outlined in step S3 of FIG. 3 where an information block IB consisting of five information cells C1, . . . , C5 having a color assigned to a respective statistical value. For example, information cell C1 having an orange color corresponds to the maximum value Max, information cell C2 having a purple color corresponds to the 75%-quartile Q75, information cell C3 having a purple color corresponds to the median MN, information cell C4 having a blue color corresponds to the 25%-quartile Q25 and information cell C5 having a grey color corresponds to the minimum value Min. The arrangement of the information cells C1, . . . , C5 top-down within an information block IB could be different to the above mentioned one.

This procedure is made for the data values of each time slot ts of the sensor data to be monitored. The information blocks IB with their information cells C1, . . . , C5 are then displayed (step S4) on a monitor in their sequence of appearance in the set of data for indicating a color gradient of the information cells over time. In the low area of FIG. 3, three rows of a sequence of information blocks IB are displayed. Since the size of a screen is limited in width, the sequence is wrapped according to the arrow SIB on the left side of the visualization.

Figures 4, 5:
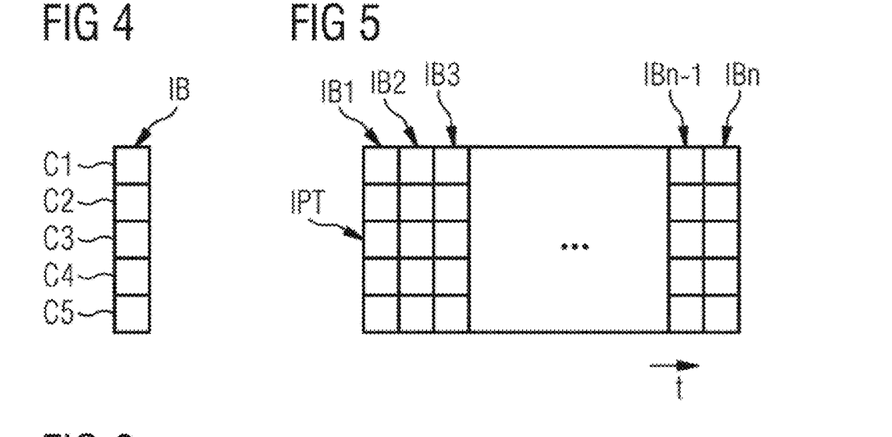
FIG. 4 shows an exemplary embodiment of an information block consisting of a number of information cells.
FIG. 5 illustrates an information pattern consisting of a number of information blocks located in a row.

FIG. 4 shows the principle construction of an information block IB. As already described, the information block IB consists of a number of information cells C1, . . . , C5. By way of example, the information block consists of five information cells C1, . . . , C5. However, if different statistical values compared to those as chosen above are calculated, the number of information cells can be less or greater than five.

By way of example, the information cells C1, . . . , C5 of an information block IB are arranged top-down. When displaying a sequence of information blocks IB1, . . . , IBn to form an information pattern IPT as shown in FIG. 5, the plurality of information blocks is arranged from left to right in the direction of time scale t.

In an alternative solution, the information cells C1, . . . , C5 of an information block IB could be arranged from left to right and the sequence of information blocks in an information pattern IPT could be arranged top-down.

The information pattern IPT as shown in FIG. 5 can be used to display data values of, for example, a day. If each time slot is whose data are aggregated in an information block IB has a length of 10 minutes, the number n of information blocks IBn is 144.

Figure 6:
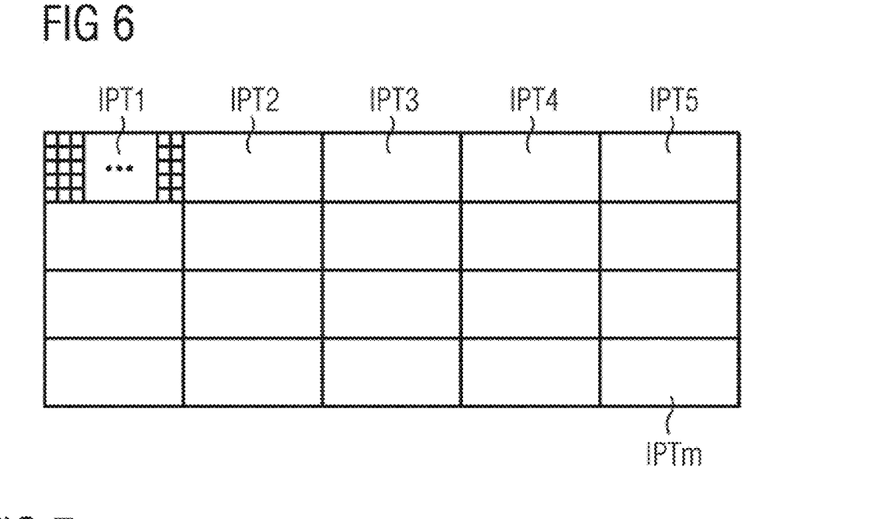
FIG. 6 illustrates a pattern, consisting of a plurality of information patterns according to FIG. 5.

When arranging the information patterns IPT1, . . . , IPTm in a manner as shown in FIG. 6, data values of e.g. 20 days (i.e. m=20) can be visualized on a screen. In the example shown in FIG. 6, five days are arranged from left to right, wherein the first days 1 to 5 are arranged in a first row, days 6 to 10 are arranged in a second row, days 11 to 15 are arranged in a third row and days 16 to 20 are arranged in a forth row.

According to the size and the number of pixels that can be visualized on the screen, the number m of days (or any other arbitrary time period) could be chosen in another way.

Figure 7:
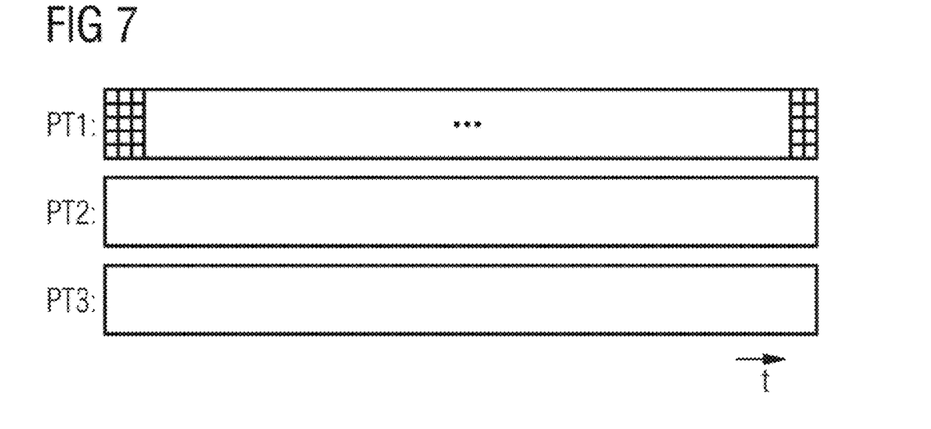
FIG. 7 illustrates three rows, aligned with each other and consisting of a plurality of information pattern according to FIG. 5.

To enable an easy comparison of changes in the aggregated data values over time, a number of rows could be aligned top-down. This is illustrated as an example in FIG. 7. By way of example, three patterns PT1, PT2, PT3 are arranged about each other. The time period which is visualized within one row might be chosen by a user. The time period might be a day, for example. The size of the time periods can be chosen arbitrarily with, for example, 10 minutes or 15 minutes per time slot for each information block. By arranging the patterns with the aggregated statistical values by means of the information blocks consisting of the number of information cells as explained above, recurring events can easily be detected because of a significant color change at the same time of the time scale.

Figure 8:
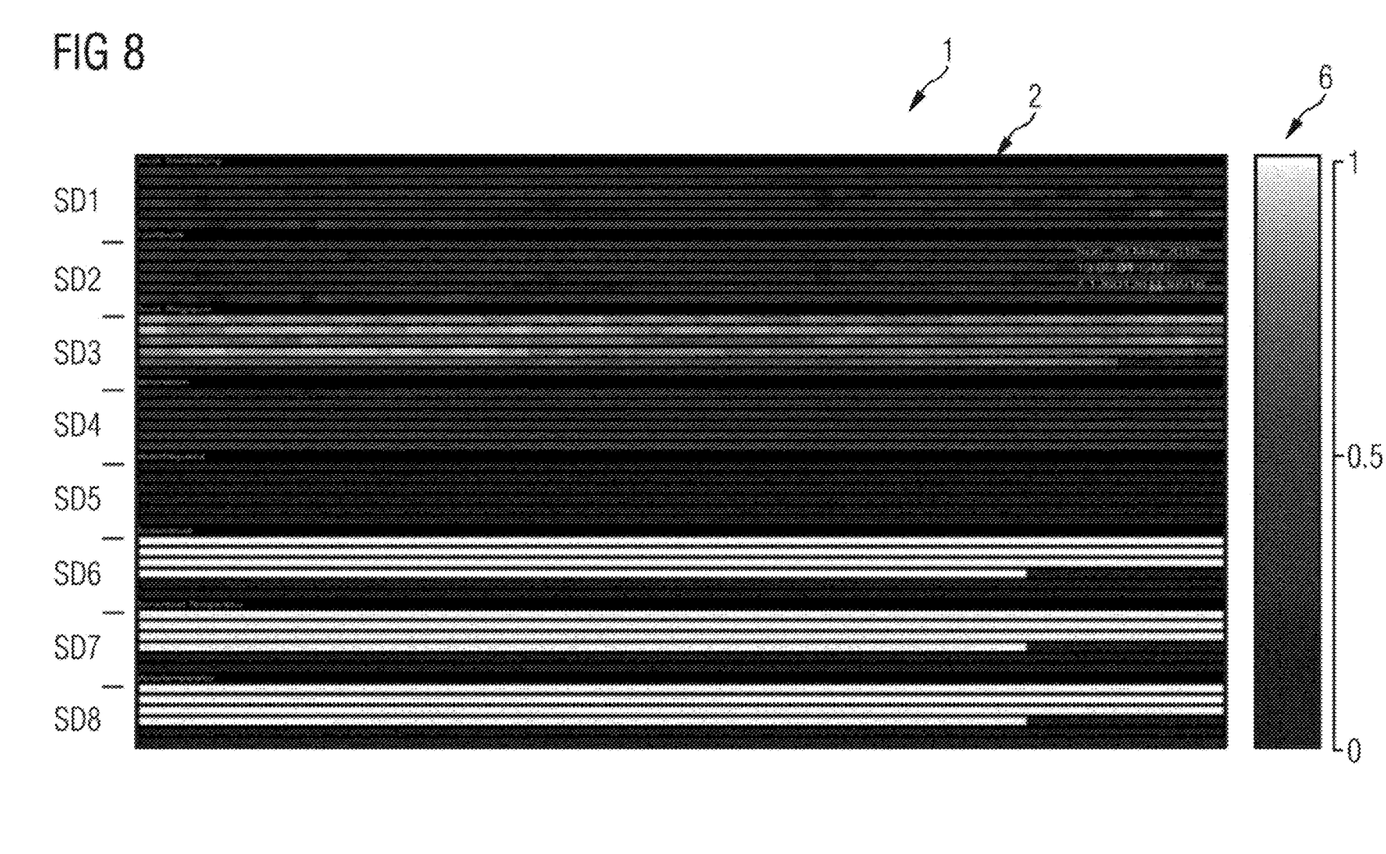
FIG. 8 illustrates an exemplary colored visualization on a screen consisting of a plurality of aggregated data values of a plurality of data sources thereby indicating changes in the data values by color changes.

FIG. 8 shows a visualization 1, where aggregated data values of eight data sources SD1, . . . , SD8 are shown in a graphical section 2 of a screen. Each of the data values of the eight data sources SD1, . . . , SD8 is visualized in, by way of example only, six rows. In each row, a sequence of information blocks consisting of a number of information cells having a respective color assigned to their statistical value, is displayed. As can be easily seen from the visualization 1, the aggregated data values of data source SD1 seems to have no significant changes with regard to their statistical values since the color gradient seems to be more or less stable (i.e. mostly dark colors). In contrast, data values of data source SD3 changes their color from a light color to a dark color without switching back any more. This change in the statistical values might be a hint that there is a technical reason in the monitored technical system. The same is with the data values of data source SD4. Here, a change occurs from darker colors to lighter colors. As can be easily seen from the aggregated data values of the data sources SD6, SD7 and SD8, there is an abrupt change of the color from a light color to a very dark color. The color change within the aggregated data values of data sources SD6, SD7 and SD8 seems to occur at the same time, since the color change is aligned.

Figure 9:
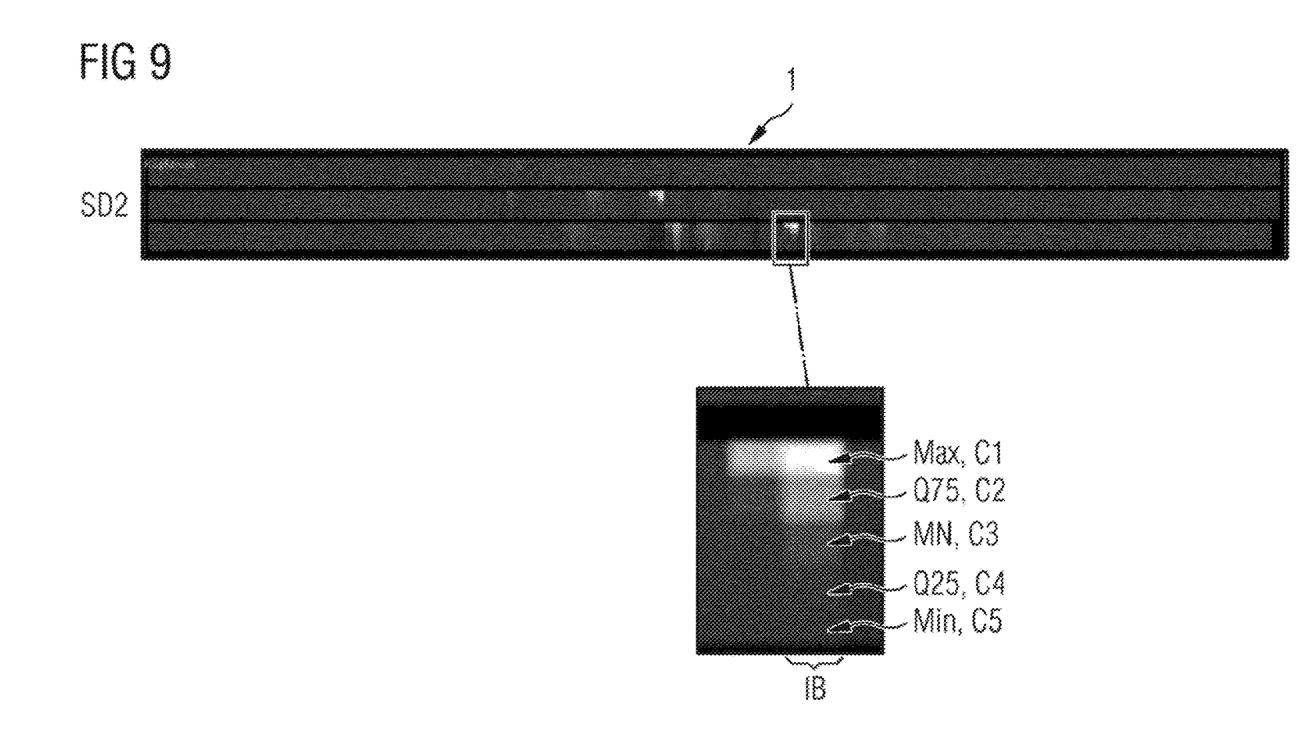
FIG. 9 illustrates another example of a visualization according to embodiments of the invention illustrating an enlarged cutout showing the information cells of an information block and their respective colors according to a color scale.

FIG. 9 shows a visualization 1 of aggregated data values of a data source SD2 together with an enlargement in the sequence of information blocks. It can be seem that the information block IB consists of five information cells C1, . . . , C5 where the statistical value Max of the topmost information cell C1 has a light, nearly white color, the information cell C2 corresponding to the 75%-quartile Q75 has a lighter, yellow color, the information cell C3 corresponding to the median MN has a light red color, the information cell C4 corresponding to the 25%-quartile Q25 has a dark red color and the lowest information cell C5 corresponding to a minimum value Min has a dark violet color.

This kind of visualization helps the user watching the screen to realize whether a change in the data values of the data source has occurred. However, monitoring of changing data values can be assisted by a computer by monitoring a significant change in the color (or its corresponding color value). This monitoring can be made by using thresholds and/or monitoring positive or negative gradients in color changes.

Summarizing, the method uses a data reduction to enable an easy visualization of a huge amount of acquired data values. To visualize expected values, the data distribution and extreme values for all time steps in the data values are considered in order to be able to detect anomalies. Therefore, different aggregation is applied. From each time slot, extreme values and statistical values representing a distribution of the subset of data values of the time slot are extracted. By way of example, a median, and 25%- and 75%-quartiles have been considered to be useful. However, other statistical values might be chosen as well. The values are mapped to pixel or information cells representing sensor values during the time slot. The pixel or information cells are aligned vertically from bottom to top (or horizontally from left to right) according to their values and form a group of cells (called information block) representing a time interval. These time intervals are aligned from left to right in rows (or alternatively top-down) according to their start time. These rows (alternatively columns) represent a higher representative time interval such as one hour, one day, one week, one year in order to provide a meaningful representation allowing to discover recurring or seasonal patterns.

By this aggregation and visualization of statistical values, a full interpretation of a time interval can be restored. An expected value and data distribution is visible by the statistical values which are not affected by outliers. Further, extreme values are also visible and can indicate anomalies or extreme behavior of the technical system.

As a result, the visualization can visualize theoretically an unlimited number of values of different data sources over time, depending on the level of aggregation. Therefore, scalability can be ensured, scrolling and overplotting can be avoided.

The method reveals recurring patterns if rows and blocks are properly specified.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for computer-assisted monitoring of a technical system, comprising:
   receiving, as a data stream, a set of sensor data from at least one data source, the set of sensor data comprising a plurality of time series data values acquired within a given time period and with a given frequency;
   dividing the given time period into a plurality of time slots of equal length, each of the time slots comprising a subset of sensor data values;
   for each time slot, calculating statistical values from the subset of sensor data values, at least one first statistical value comprising an extreme value and at least one second statistical value describing a distribution of the subset of sensor data values;
   for each time slot, mapping each of the at least one first statistical value and the at least one second statistical value to a respective first and a respective second color value of a color scale;
   for each time slot, mapping the at least one first and the at least one second color value in an information block comprising a number of information cells corresponding to the number of color values and being arranged adjacent in a predetermined manner, wherein each information cell is colored with the respective color value of the at least one first statistical value and the at least one second statistical value; and
   displaying the information blocks of at least a part of the time slots (ts) in their sequence of appearance in the set of data on a screen for indicating a color gradient of the information cells over time.

2. The method according to claim 1, wherein the at least one first statistical value comprises a maximum value and/or a minimum value as extreme values.

3. The method according to claim 1, wherein the at least one second statistical value comprises one or more of the following values:
   a mean of the subset of sensor data values;
   a standard deviation of the subset of sensor data values;
   a quantile of the subset of sensor data values, in particular:
   a median of the subset of sensor data values;
   a 25%-quartile of the subset of sensor data values; and
   a 75%-quartile) of the subset of sensor data values.

4. The method according to claim 1, wherein the information cells of an information block are arranged top-down and a plurality of information blocks is arranged from left to right.

5. The method according to claim 1, wherein the information cells of an information block are arranged from left to right and a plurality of information blocks is arranged top-down.

6. The method according to claim 1, wherein the information blocks of a predetermined number of subsets of datasets corresponding to a first time interval are displayed in a first line, being a row or column, and the information blocks of the same number of subsets of datasets corresponding to a second time interval not intersecting with the first time interval are displayed in a second line, being a row or column, wherein the first and the second lines are displayed aligned and below or beside each other.

7. A computer program product, comprising a computer readable hardware storage device having computer readable program code stored therein, said program code executable by a processor of a computer system to implement a method for computer-assisted monitoring of a technical system, the method comprising:
   receiving, as a data stream, a set of sensor data from at least one data source, the set of sensor data comprising a plurality of time series data values acquired within a given time period and with a given frequency;
   dividing the given time period into a plurality of time slots of equal length, each of the time slots comprising a subset of sensor data values;
   for each time slot, calculating statistical values from the subset of sensor data values, at least one first statistical value comprising an extreme value and at least one second statistical value describing a distribution of the subset of sensor data values;
   for each time slot, mapping each of the at least one first statistical value and the at least one second statistical value to a respective first and a respective second color value of a color scale;
   for each time slot, mapping the at least one first and the at least one second color value in an information block comprising a number of information cells corresponding to the number of color values and being arranged adjacent in a predetermined manner, wherein each information cell is colored with the respective color value of the at least one first statistical value and the at least one second statistical value; and displaying the information blocks of at least a part of the time slots (ts) in their sequence of appearance in the set of data on a screen for indicating a color gradient of the information cells over time.

8. A system for computer-assisted monitoring of a technical system, comprising:
- a processor, wherein the processor is configured to receive, as a data stream, a set of sensor data from at least one data source, the set of sensor data comprising a plurality of time series data values acquired within a given time period and with a given frequency;
- wherein the processor is configured to divide the given time period into a plurality of time slots, each of the time slots comprising a subset of sensor data values, the processor further being adapted to:
- for each time slot, calculate statistical values from the subset of sensor data values, at least one first statistical value comprising an extreme value and at least one second statistical value describing a distribution of the subset of sensor data values;
- for each time slot, map each of the at least one first statistical value and the at least one second statistical value to a respective first and a respective second color value of a color scale;
- for each time slot, map the at least one first and the at least one second color value in an information block comprising a number of information cells corresponding to the number of color values and being arranged adjacent in a predetermined manner, and to color each information cell with the respective color value of the at least one first statistical value and the at least one second statistical value; and
- wherein the processor is configured to display the information blocks of at least a part of the time slots in their sequence of appearance in the set of sensor data on a screen for indicating a color gradient of the information cells over time.

9. The system according to claim 8, wherein the processor is configured to evaluate the color gradient of the information cells over time.

* * * * *